(No Model.) 2 Sheets—Sheet 2.
O. UNZICKER.
VELOCIPEDE.
No. 393,044. Patented Nov. 20, 1888.
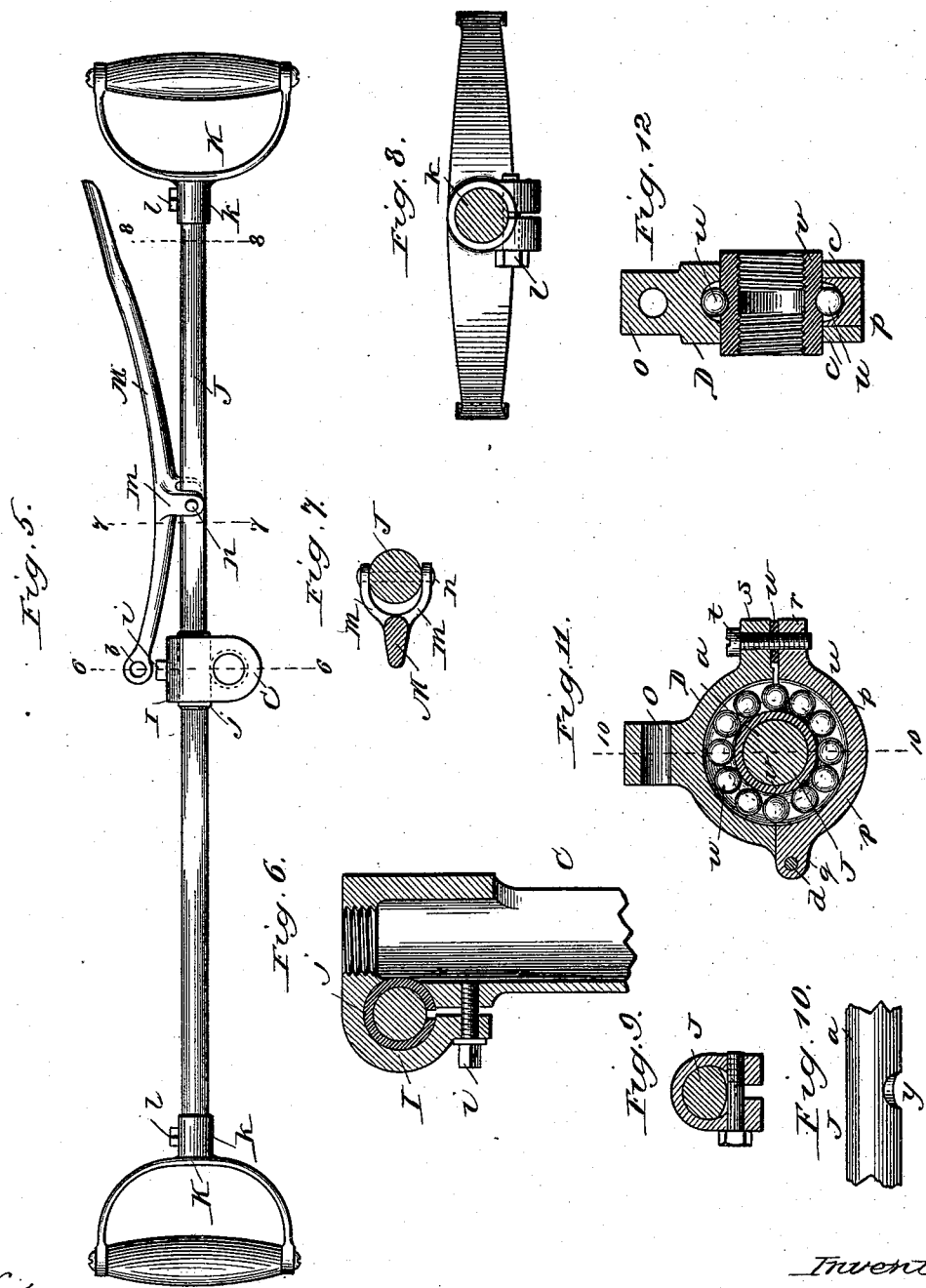

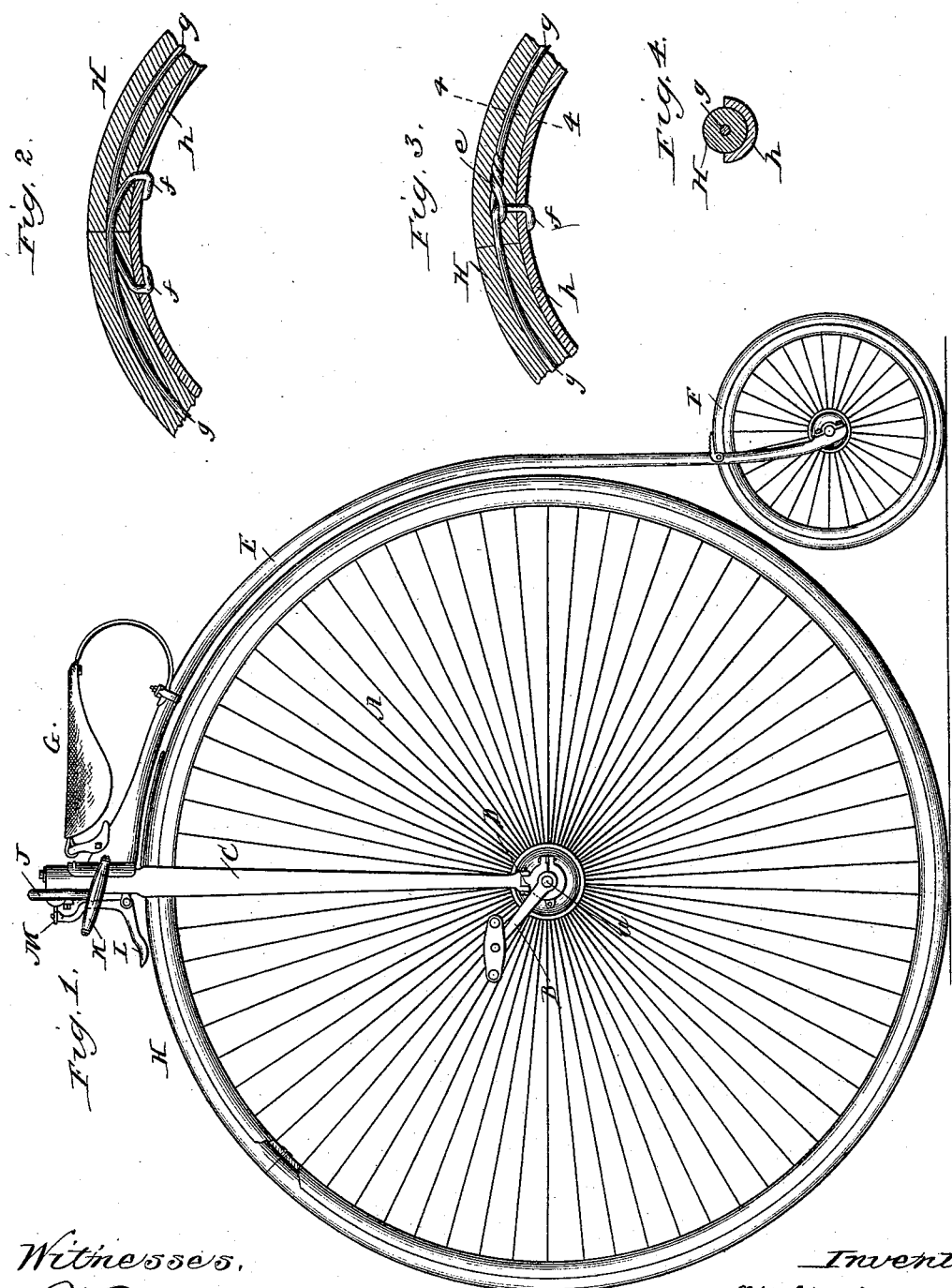

United States Patent Office.

OTTO UNZICKER, OF CHICAGO, ILLINOIS, ASSIGNOR TO ADOLPH SHOEN-
INGER, OF SAME PLACE.

VELOCIPEDE.

SPECIFICATION forming part of Letters Patent No. 393,044, dated November 20, 1888.

Application filed January 17, 1888. Serial No. 261,059. (No model.)

*To all whom it may concern:*

Be it known that I, OTTO UNZICKER, a citizen of the United States of America, residing at Chicago, in the county of Cook and State of Illinois, have invented certain new and useful Improvements in Velocipedes and Bicycles, of which the following is a specification, reference being had therein to the accompanying drawings.
This invention relates to improvements in velocipedes and bicycles, and more particularly, first, to novel devices for securing rubber tires upon the rims of the wheels; secondly, in a device for securing the steering-lever to the upper extremity of the standard; thirdly, in a device for adjustably securing the handles upon the ends of the steering-lever; fourth, in a device for pivotally connecting the brake-lever to the steering-lever, and, fifth, in the peculiar construction of the anti-friction journal-boxes for the axle of the main wheel, all as will be hereinafter more fully described and specifically claimed.

In the accompanying drawings, Figure 1 represents an elevation of a bicycle having my improvements; Fig. 2, a longitudinal section of the rim and tire of the wheel, showing my improved method of securing the same; Fig. 3, a modification of the same, and Fig. 4 a cross-section of the same on line 4 4 in Fig. 3. Fig. 5 is a plan of the steering-lever; Fig. 6, a vertical section of the upper end of the standard and steering-lever on line 6 6 in Fig. 5; Fig. 7, a section of the steering-lever and brake-lever on line 7 7 in Fig. 5; Fig. 8, a section on line 8 8 in Fig. 5 and an end elevation of the handle; Fig. 9, a cross-section of the notched end of the steering-lever and of the split hub of the handle; Fig. 10, an elevation of the notched end of the steering-lever; Fig. 11, a longitudinal vertical section of the journal-box, and Fig. 12 a transverse vertical section on line 10 10 in Fig. 11.

Corresponding letters in the several figures of the drawings designate like parts.

A denotes the main wheel, and *a* the axle of the same, having secured upon its ends the treadles or cranks B, of any usual construction.
C is the bifurcated standard, having pivotally secured to its lower ends the journal-boxes D and to its upper end the reach or backbone E, also bifurcated in its lower end for pivoting therein the hind wheel, F. Upon this backbone E is secured the saddle G.

The tire H of the wheel consists of a cylindrical tubular rubber stretched over the semi-circular grooved rim *h* of wheel A. This tire H, I secure by drawing a wire, *g*, through the central hole of the same, and the end of this wire *g* of one abutting end of the tire I insert into the opposing abutting end of the tire a short distance, and then through a hole in such tire and in the rim of the wheel, and then, after stretching both ends of the wire *g* sufficient for thoroughly tightening the tire upon the rim, I bend these ends of the wire to form hooks *f* inside against rim *h* of the wheel.

Instead of securing both ends of the wire inside of the rim of the wheel, after being thus passed by each other and through holes in the tire and rim, I can also form a loop, *e*, to one end of the wire and then pass the other end through such loop, in which case only one end is passed through a hole in the tire and rim of the wheel, to be secured by a single hook *f*, all as shown by Fig. 3.

The upper end of the bifurcated standard C has a rigid eye-lug, I, to its front, which eye-lug is radially slotted from its lower side, where, by a clamp-screw, *i*, tapped into the standard C, it can be contracted. This eye-lug I is bored out for a bushing or collar, *j*, also slitted on one side, which bushing *j* is slipped over the steering-lever J, to be on the middle thereof, and then, after being inserted into eye-lug I, the screw *i* is tightened, and thereby the said handle is rigidly secured by clamping. By making the steering-lever somewhat larger in diameter at its central portion the bushing or collar *j* can be dispensed with.

Upon the ends of lever J are adjustably secured bow-shaped handles K, each provided with a hub, *k*, also radially slitted from one side, where it is provided with eye-lugs for a clamp-screw, *l*, by which, with tightening the same, the said handle is rigidly clamped upon the cylindrical end of the lever J on any desired angular position; and for the purpose of locking such handles K upon the ends of the steering-lever J, so that, with loosening the screw *l* for adjusting, the handle K will not come off, each end of said lever J is provided with a notch, y, for the shank of clamp-screw l to enter and hold the handle laterally in position, said notch being segmental or crescent shape to allow a sufficient angular adjustment of handle K.

The brake-lever M to one side has two curved eye-brackets, m, that are vertically in line with each other and embrace the lever J, and are pivotally secured thereto by a rivet, n, passed through a hole in such lever J and through both eye-brackets m. By this construction the said lever J can be made of common round iron or steel and can be more readily burnished. The eye-lug b of lever M connects with the L-shaped brake-shoe L in the usual manner. Each journal-box D consists of the rigid circular casing having eye-lug o for pivotally connecting it with one of the ends of bifurcated standard C. This casing D is slotted out from its bottom to the middle, leaving for the bottom half only semicircular flanges c. Between these flanges c is fitted a semicircular piece, p, having an eye-lug, q, inserted between two similar eye-lugs of casing D, and pivotally secured thereto by a rivet, d, to form a hinge-connection therewith. The opposite side of piece p has an eye-lug, r, corresponding with eye-lug s of casing D, and a screw, t, passed through eye-lug s and engaging the screw-thread in eye-lug r, adjustably secures the piece p to the casing D. The upper half of casing D and the piece p are provided internally with a segmental groove that forms the exterior guide or endless track for a series of case-hardened steel balls, u.

A sleeve, V, internally screw-threaded, is rigidly secured upon each end of axle a to form the journals thereof, and each such sleeve V has a segmental groove turned on its middle, which, when such journal is inserted into casing D, will form the internal guide and annular bearing for the balls u. The sleeve V, however, can be dispensed with and the annular groove can be formed in the axle direct.

The pressure exerted by the weight to be carried by the journal-box D being always against the upper semicircle of the same, the groove formed in the solid portion of the casing will be the bearing and wearing surface, while the piece p will only guide and hold the non-bearing balls in position as they follow their annular track; and, this piece p being made adjustable by means of screw t, any lost motion caused from wear can be compensated. A small piece of sheet-rubber, w, inserted between eye-lugs r and s, will yieldingly hold apart such lugs and will be compressed by tightening screw t, thereby holding the parts rigid and preventing the screw t from becoming loose by the movement of the vehicle, and at the same time it will provide a dust-tight joint in said box.

What I claim is—

1. The combination, with the grooved rim of a wheel, of a rubber tire provided with a bore, and a wire having a loop on one end inserted in said bore and extended around the entire wheel, and having its opposite end inserted through the loop and passed out through and bent or clamped upon the rim, as set forth.

2. In a velocipede, the standard C, provided with slitted eye-lug I and with clamping screw i, in combination with steering-lever J and with slitted bushing j, all substantially as set forth.

3. In a velocipede, the combination, with the steering-lever J, having cylindrical ends provided with notches y, of handles K, provided with slitted hubs k, and with clamp-screws l, entering the notches y, substantially as and for the purpose set forth.

4. The journal-box for a velocipede-axle, consisting of a casing slotted at right angles to the line of the axle to form one half of the bearing, and of a semicircular piece fitted into such slot to form the other half of the bearing to be adjustable therein, as set forth.

5. In a velocipede, the casing D, slotted to receive semicircular piece p, hinged to such casing at one side and adjustably secured at the opposite side by a clamp-screw, the casing D and piece p being interiorly grooved to form an endless circular track for metal balls u, that form the bearing for the axle, substantially as and for the purpose set forth.

6. In a velocipede, the axle a, with annularly-grooved sleeve V, in combination with casing D, slotted to receive circular piece p, hinged to the casing at one side and adjustably secured at the opposite side by a clamp-screw, the casing D and piece p being interiorly grooved to form an endless circular track for metal balls u, forming the bearing for axle a, all substantially as and for the purpose set forth.

In testimony whereof I affix my signature in presence of two witnesses.

OTTO UNZICKER.

Witnesses:
  WILLIAM H. LOTZ,
  OTTO LUBKERT.